Dec. 6, 1938.  E. THYS  2,139,046
HOP SEPARATOR
Filed June 17, 1936
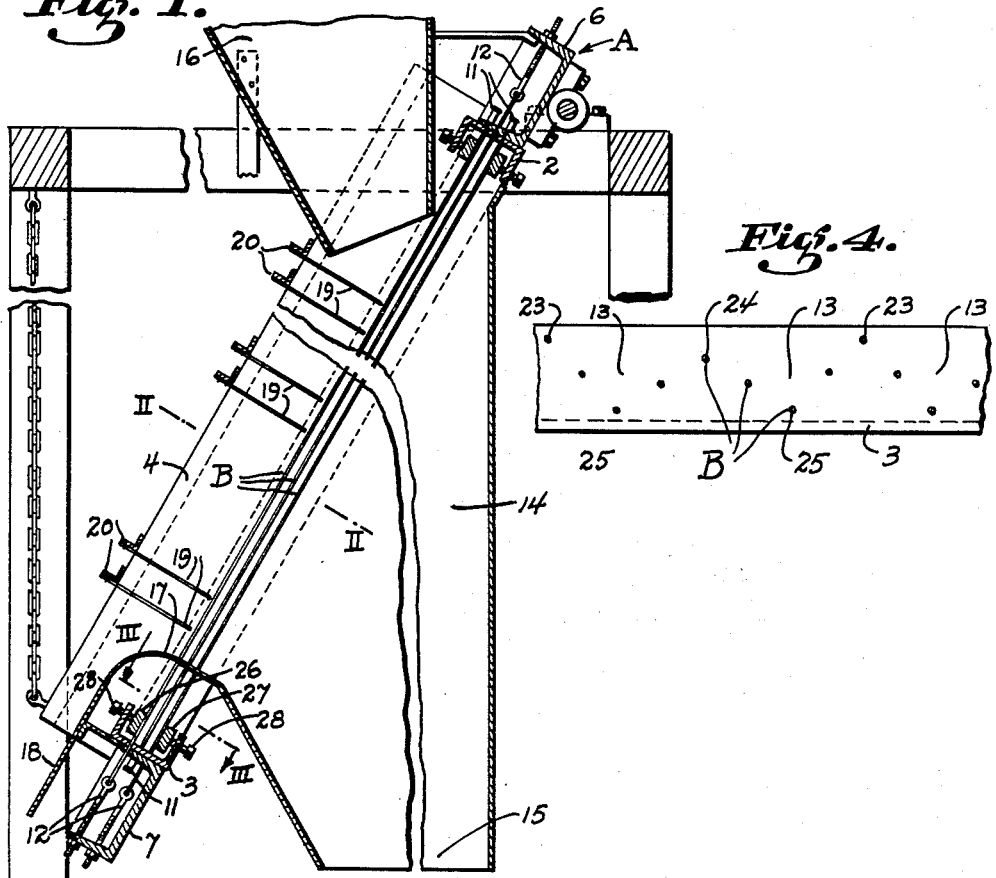
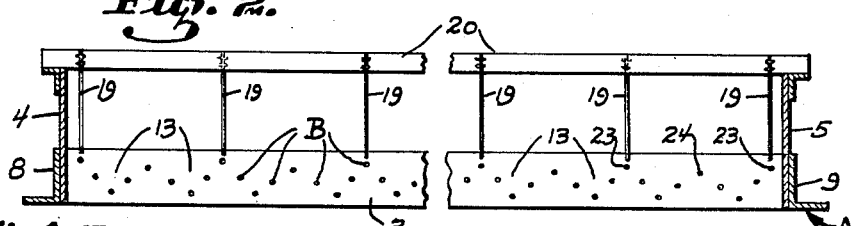
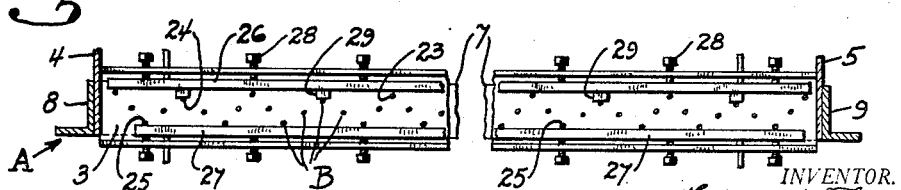
INVENTOR.
Edouard Thys.
BY
Chas. E. Townsend.
ATTORNEY.

Patented Dec. 6, 1938

2,139,046

UNITED STATES PATENT OFFICE 2,139,046

HOP SEPARATOR

Edouard Thys, San Francisco, Calif.

Application June 17, 1936, Serial No. 85,718

1 Claim. (Cl. 209—99)

This invention relates to a separating machine and especially to a machine for separating hops from leaves, petals, stems, and other foreign matter.

The picking of hops by machinery is now a comparatively old art as machine picking has been in continuous use on a comparatively large scale in California and other States for many years. The type of machine generally employed consists of a series of revolving drums and/or belt from the surface of which project V-shaped flexible wire fingers. The vines to be picked are passed over and under the drums and belts by a conveyor and as they pass through they are combed by the V-shaped fingers and the hops are removed during the combing operation. A great many leaves and stems are also removed and some of the hops are broken, thereby forming petals, hence after the picking operation has been completed it becomes necessary to separate the hops from the leaves, petals, stems, etc., as the cleaner the hops the higher the market value.

In actual practice one type of machine is employed for separating the leaves and petals from the hops; another type is employed for separating stems from hops; again, machines are employed which attempt to separate in one operation both the leaves, the petals, and the stems from the hops. The present invention relates to the stem separating type.

The object of the present invention is generally to improve and simplify the construction and operation of separators; to provide a separator which is particularly intended for separating hops from stems, and other foreign matter, and more specifically stated, to provide an inclined frame having wires strung from end to end thereof, said wires being fairly closely spaced and arranged at different levels to form an undulating surface transverse of the frame and troughs longitudinally thereof. The hops, stems, etc., are deposited at the upper end of the frame and due to the inclination thereof and the wires carried thereby, the hops will slide and roll downwardly and discharge from the lower end while the stems, etc., will pass between the wires and fall through, thereby being separated from the hops.

The separator is shown by way of illustration in the accompanying drawing, in which—

Fig. 1 is a central, vertical section of the separator;

Fig. 2 is a cross section taken on line II—II of Fig. 1;

Fig. 3 is a cross section taken on line III—III of Fig. 1;

Fig. 4 is an enlarged diagrammatic view showing the arrangement of the separating wires.

Referring to the drawing in detail, and particularly Figs. 1, 2 and 4, A indicates in general a main frame which may be supported in any suitable manner, but preferably on a pivot so as to permit adjustment of the inclination. The frame is rectangular in shape and consists of an upper and lower channel-shaped members 2 and 3, which extend crosswise of the frame. These channel members are secured by welding, or other means, between a pair of side plates 4 and 5, see Fig. 2, extending from end to end of the frame. The frame also includes a pair of upper and lower channel-shaped members 6 and 7 which are secured to the channels 2 and 3 and to a pair of reinforced angle bars 8 and 9 disposed one on each side of the frame exterior of the side plates 4 and 5.

The frame, as a whole, constitutes a support for a plurality of wires generally indicated at B. These wires extend from the upper to the lower end of the frame and pass through perforations formed in the channels 2 and 3, being secured by head members 11 and being secured at the opposite ends to adjustable eye bolts 12 which are, in turn, secured in the channels 6 and 7; the adjustable eye bolts being provided to properly stretch or tighten the individual wires.

The wires are arranged as diagrammatically shown in Fig. 4 to produce an undulating surface crosswise of the frame, or in other words, a series of parallel troughs 13 which extend longitudinally from the upper to the lower end of the frame. The wires are sufficiently closely spaced to prevent hops from passing between them but are at the same time sufficiently widely spaced to permit stems, etc., to fall through into a housing 14 from the lower end of which they may be discharged through an opening 15.

In actual practice the hops, stems, etc., to be separated are delivered to the upper end of the frame by a hopper or chute 16. The entire material falls directly on the wires and due to their inclination all of the material will start to slide downwardly toward the lower end of the frame, the hops being comparatively round will roll and slide and will finally bounce over a rounded barrier plate, such as shown at 17, to be finally discharged over a plate 18. If any leaves mixed with the hops happen to fall edgewise they will immediately pass between the wires and drop into the housing 14, the same being true of the stems and petals.

The machine is particularly intended to remove straight stems. If the stems happen to fall parallel to the wires they will pass through. On the other hand, they may fall crosswise of the wires, or at an angle thereto, and will slide downwardly thereon. If that happens, the stems will be engaged by the fingers 19 and will be swung around and will be further straightened out by rolling down into the troughs. This action tends to position the stems parallel to the wires and they will thus fall through. The wires, or fingers 19, are secured to angle bars 20 extending crosswise of the frame, the fingers being staggered so that all of the leaves and stems which tend to slide downwardly will be engaged by the fingers at one point or another before the lower end is reached. A few leaves and stems will reach the barrier 17 but they will lodge at this point and may be removed from time to time by an operator stationed at this point.

As previously stated, the wires are normally spaced so that the hops will not fall through but seasons are encountered when the hops are smaller than usual and in that case it is advisable to bring the wires a little closer together, this being particularly true of the upper and lowermost wires indicated at 23, 24 and 25. To bring these wires closer to the remaining wires cross bars 26 and 27 are adjustably secured by means of screws 28 to the channels 2 and 3. The bar 27 engages the lowermost wires 25 and forces them upwardly against the wires while the bars 26 engage the upper wires 23. The wires 24 are slightly below the wires 23 and blocks 29 are therefore welded, or otherwise secured, to the bars 26 so as to engage the wires 24 to force them downwardly. By this means the wires may be closer spaced or separated as conditions demand and most of the smaller sizes of hops will be caught.

A machine of this character is of large capacity. It is exceedingly simple in construction and operation. No moving parts are required and practically any labor, whether skilled or otherwise, may be employed in its operation. Furthermore, the separation obtained is comparatively clean and, as it separates the hops from the stems, and leaves if present, all the work of separation is completed in this machine.

While this and other features of the invention are more or less specifically described, I wish it understood that various changes may be resorted to within the scope of the appended claim. Similarly, that the materials and finish of the several parts employed may be such as the manufacturer may decide, or varying conditions or uses may demand.

Having thus described my invention, what I claim and desire to secure by Letters Patent is:—

In a separator of the character described a rectangular-shaped elongated frame, a cross-bar secured at each end of the frame, spaced wires extending longitudinally of the frame and passing through the cross-bars, means for permanently securing the wires to one cross-bar, tensioning means connected with the opposite ends of the wires and cooperating with the other cross-bar to maintain the wires taut, said wires being disposed in at least three different elevations and in trough-shaped formation crosswise of the frame to form a series of substantially V-shaped parallel troughs, each side wall of which is composed of at least three wires, and adjustable cross-bars in the frame engageable with the uppermost and lowermost wires to adjust the spacing between said wires and intermediate wires.

EDOUARD THYS.